United States Patent [19]

Pühringer et al.

[11] 4,036,658

[45] July 19, 1977

[54] PROCESS FOR THE PREPARATION OF AN IMPREGNATED BUILDING MATERIAL, AND THE PRODUCT THEREBY OBTAINED

[75] Inventors: Josef Alfred Pühringer, Taby; David Yngve Mikael Lund, Bromma; Rolf Bo Fröberg, Jarna; Erik Vilhelm Bernhard Ornelius, Bromma, all of Sweden

[73] Assignee: Nya Asfalt AB, Stockholm, Sweden

[21] Appl. No.: 464,208

[22] Filed: Apr. 25, 1974

[30] Foreign Application Priority Data

May 4, 1973  Sweden .............................. 7300155

[51] Int. Cl.$^2$ ............................................. C04B 7/35
[52] U.S. Cl. ........................................ 106/90; 106/97; 106/118
[58] Field of Search .................. 106/90, 118, 97, 67, 106/119

[56] References Cited

U.S. PATENT DOCUMENTS

| | | | |
|---|---|---|---|
| 2,776,914 | 1/1957 | Faulwetter | 106/97 |
| 3,010,840 | 11/1961 | Goff et al. | 106/97 |
| 3,042,535 | 7/1962 | Hiltrop et al. | 106/97 |
| 3,353,975 | 11/1967 | Shannon et al. | 106/69 |
| 3,650,784 | 3/1972 | Albert et al. | 106/90 |

*Primary Examiner*—J. Poer
*Attorney, Agent, or Firm*—Curtis, Morris & Safford

[57] ABSTRACT

The invention refers to a process for the preparation of a hydrofobous building material containing a ballast material and a binder added or formed in connection with the manufacture. At least part of the ballast material is or is made water-repellant and is admixed with the rest of the ingredients of the building material, the amount of water-repellant ballast material and the grain size thereof being adapted so that the water-repellant characteristics of the building material is brought to an acceptable level while maintaining a sufficient wet vapor diffusion ability.

12 Claims, No Drawings

PROCESS FOR THE PREPARATION OF AN IMPREGNATED BUILDING MATERIAL, AND THE PRODUCT THEREBY OBTAINED

The present invention refers to a process for the preparation of a building material impregnated with a hydrofobating agent and containing a ballast material and a binder. The invention also covers products obtained by such process.

For a very long time buildings have been manufactured from porous, mineral materials from technical, economical and aesthetical reasons. These materials may be natural, it being necessary only to give the building elements a suitable shape, or synthetic, the minerals present in nature having been converted, either by mechanical working or by controlled physical processes and chemical procedures. In the first group building elements of sand stone, lime stone, granite and other types of stones may be mentioned. In the other group bricks and mortars in different forms, such as plaster, finishing mortar and concrete and asbestos cement and similar products, may be mentioned.

All of these building materials contain small cavities (capillaries, pores, fissures), either from the beginning or as a course of the method of manufacture. The cavities give the material the ability of transporting water and liquid (and also gases, of course), and said ability may result in extensive damages, the damage mechanism being of varying kinds. As an example of damages resulting from pore transport phenomena in mineral porous materials the following may be mentioned.

Salt formations (efflorescence) in brick walls, either resulting from the transportation of salts in the brick or in the mortar.

Concrete coatings and concrete constructions adjacent to roads are often damaged by influence from road salts, salt and melting water penetrating into the pore and capillary system of the material, which causes destruction of the surface layer by combined salt and frost bursting or cracking.

Relics of culture of preferably sand stone are destroyed in that sulphur dioxide or sulphur trioxide dissolved in water attacks the material in the pore and capillary system.

Coating layers for reinforced concrete constructions are destroyed usually in view of carbonatization, carbon dioxide dissolved in the water decreasing the alkality of the concrete material causing corrosion of the reinforcement material and this results in bursting of the covering layer.

For a long time attempts have been made to prevent moisture transportation into the material by applying certain protective layers preventing water from penetrating into the construction. Facade surfaces, upper surfaces of road constructions and surfaces of building elements, such as brick, roofing tile, have been treated in such a manner as to impart thereto a protective layer of organic silicon compounds. The surfaces have been treated either with a solution of said organic silicon compounds in water or another solvent or said compounds have been mixed into mortar and paints before the use.

The purpose of using this type of impregnation is to make the surface proper of the material water-repellant. The impregnating liquid or the solvent for the impregnating agent is sucked into the capillaries, pores and fissures of the material and mixed with the surface layer material. The impregnating agent makes, after the evaporation of the solvent, the walls of the capillaries, pores and fissures water-repellant, in view of which liquid transportation through the impregnated surface layer is prevented.

Already very low concentrations of organic silicon compounds of a certain composition have given the material as a whole a water-repellant effect. In spite of the fact that the construction treated in such a manner can resist a water pressure corresponding to significant rates of pelting rain, it has still left the ability to let vapour penetrate, which means that its so-called vapour diffusion resistance is not reduced. The materials treated with organic silicon compounds have still relatively open pores and capillaries - it is only the walls of their cavities that are covered with a water-repellant protective layer. The treatment with these materials reduce the so-called dry vapour diffusion only to a very small extent. In building constructions, wherein transport phenomena for moisture can appear, the following damage mechanism can, however, develop. A surface layer treated by impregnation is outwardly water-repellant against atmospheric precipitation (such as rain, hail, snow, dew etc.) and similar moisture attacks. However, the surface layer of the construction is water-repellant also inwardly, which can mean the following. The non-impregnated material behind the impregnated surface layer can become water soaked, for instance by the condensation of water vapour, which is transported through the construction, or by atmospheric precipitation which is transported into the material through fissures in the impregnated material and moisture migration in the unimpregnated material, or by water or liquid added to the material during its manufacture. In these surface impregnated materials water is thus transported to the water-repellant surface layer.

In non-impregnated constructions the water is transported in pores and capillaries all the way out to the surface, where it evaporates by convection. This ability of evaporation of moist constructions is called the wet vapour diffusion ability of the material. Accordingly, porous materials will dry rather rapidly. If the surface layer is impregnated water in the material is transported only to the inside of the impregnated layer, and the evaporation from capillaries and pores will then take place much more slowly, since it occurs at a certain depth and thereby no convection effect is at hand. This may mean that during the cold season water will not have time to evaporate from brickwork resulting in frost damages. This may also mean that salts transported in water are deposited behind the impregnated layer and not on the surface. It is true that the non-attractive salt deposits on the surface layer are avoided, but instead salt bursting of the impregnated layer takes place.

These disadvantages are a result of homogeneous impregnation of the surface layer. The advantage of the water-repellant effect exteriorly will have to be balanced against the disadvantage that the water cannot be transported to the surface and evaporate there.

In the manufacture of concrete and mortar water must be added in a greater amount than that necessary for hardening of the binder due to workability reasons. The mixture shall to some extent be flowable or plastic. Also the ballast must be soaked with water so that the ballast material does not absorb the water required for the hardening of the binder. Thus, concrete and mortar must be prepared while using a greater amount of water than that required for the chemical process. This results i.a. in that more moisture than necessary is supplied to the construction during the cold season, which in turn may result in frost and freeze damages.

One purpose of the present invention is to prepare synthetic mineral building materials and building elements having the ability of rejecting water exteriorly but still allowing water transportation from the inside through the surface layer to the surface.

Another purpose is to prevent salt water from penetrating into the pores and capillaries of the material resulting in salt and frost bursting.

A further purpose is to prevent the ballast material from absorbing more water than necessary, which means that a smaller amount of water must be dried out.

According to the invention it has now surprisingly shown that these and other purposes may be fulfilled by using a ballast material which at least partly is or is made water-repellant. The important and surprising discovery in the process of the invention is the fact that by a suitable choice of the amount of water-repellant ballast material and grain size for this material it is possible to bring the water-repellant characteristics of the material up to an acceptable level while maintaining a sufficient wet vapour diffusion ability.

The water-repellant ballast material is suitably admixed in an amount of at least about 5% by volume based on the whole volume of used ballast material, and a particularly preferred lower limit is about 10% by volume. At thin mortar layers and small particle sizes an impregnation degree of about one third of the ballast volume is suitable. Quite generally a preferred interval is 20–50% by volume, i.e. 20–50% by volume of the ballast is impregnated with hydrofobating agent. At suitable proportions between binder and ballast, for instance 20 parts binder per 100 parts ballast, up to 100% of the ballast may be impregnated with good results. A safe upper limit with regard to the degree of impregnation of the ballast to avoid complete impregnation is about 90%, preferably 80%.

With regard to the grain size it is suitable that the predominant part of the water-repellant ballast material lies within the interval about 0.1 – 4 mm.

To obtain the intended effect with the impregnating process according to the invention the amount of water-repellant ballast material and its grain size is suitably selected in such a way that the building material at a water pressure corresponding to the effect of a pelting rain does not significantly let through any water, i.e. not more than about 0.5 1/m², h, whereas its diffusion ability with regard to wet vapour is at least about 1 g/m², h and mm Hg. With thin coatings values of 5–10 g/m², h and mm Hg are easily obtained. With such a balancing of the characteristics of the building material impregnated according to the invention essential and surprising advantages are gained while fulfilling the above stated purposes.

According to the invention it is possible to impregnate part of the ballast material, said material being either naturally occurring mineral material that has been crushed or treated in another manner, or synthetic, mineral, building material, for instance crushed cement mortar, lime mortar, concrete, clay, brick and the like. By impregnating part of this material with a hydrofobating agent, such as organic silicon compounds, before mixing the final construction becomes sufficiently impregnated to give a water-repellant effect. A construction impregnated partly in this manner has the same strength and appearance as a non-impregnated or completely impregnated construction. According to the invention it is possible also to use ballast material which per se is water-repellant.

The invention is particularly useful in connection with the use of gel-forming binders, for instance, lime and cement.

By the balanced impregnation according to the invention the result is obtained that there are alwys water transporting capillaries to the surface, whereby the wet vapour diffusion is considerably better as compared to complete impregnation according to previously known technique.

The impregnating effect and the possibility of liquid transportation in the material is according to the invention controlled not by diluting impregnating agent or diluting impregnating agent in the solution, i.e. by means of low concentrations of impregnating agent, but by the fact that particles treated with relatively high concentrations of impregnating agent or particles that are per se water-repellant are admixed with the material. The part-impregnating concentration in the material layer should be of such a magnitude that one surface thereof is water-repellant and the other surface capable of suction and that there are transport routes between the surfaces.

In the process of the invention there is obtained in the surface layer a certain valve action connected with the above indicated phenomena. The wet vapour diffusion from the inside and out towards the exterior surface is thus not significantly affected by the part impregnation and the material will in this respect behave almost as an unimpregnated material. The outward water-repellant ability of the impregnation will, however, stand in relation to the particle size and the mutual distance of the particles and their water-repellant intensity. This has to do with the fact that at a suitable particle distance the water drops on the surface obtain such a size and thereby such a surface tension that they cannot be sucked into the pores and the capillaries leading out to the surface between the impregnated particles. In order to obtain acceptable values of the wet vapour diffusion it is essential that no coherent water-repellant zones arise in the interior of the material and prevent water transportation.

A further advantage of the process of the invention is the fact that surface layer materials of different kinds applied in the wet condition adhere to a part impregnated surface but very poorly on a wholly impregnated surface. This is of importance above all in the repair of surface layers.

The process of this invention may be used in connection with all types of surface treatments and the preparation of all forms of building elements. For instance, mineral paints and paints having mineral additives may be partly impregnated. Finishing mortar and plaster and putty can be partly impregnated. Statues, ornaments of natural stone and the like may be provided with a so-called wear-out layer consisting of not too hydrofobous mineral material. Even the surface layer of brick materials may be partly impregnated in manufacture. Also whole bricks may be partly impregnated.

Concrete constructions that are subjected to moisture, for instance the upper and lower surface of concrete coatings, may be provided with a layer of partly impregnated material. Mortar can be manufactured of partly impregnated material. Building constructions and building elements can, however, be partly impregnated as a whole.

For partly impregnating ballast material of for instance the mineral type water-repellant organic silicon compounds of varying types may be used.

As organic silicon compounds there may be used silanes having the general formula: $R^2 — Si(OR^1)_3$, where $R^1$ indicates an alkyl or oxalkyl residue with 1–4 carbon atoms and $R^2$ any saturated or unsaturated alkyl, aryl, cycloalkyl or aralkyl residue, as well as siloxanes having the general formula

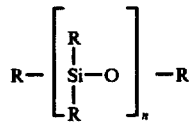

wherein R indicates any similar or different, saturated or unsaturated alkyl, aryl, cycloalkyl or aralkyl residues and n can be greater than 2.

Examples of said silanes is ethyl, butyl and hexyl trimethoxy silanes, methyl, ethyl, propyl or butyl-tri(2-methoxy-ethoxy)-silanes, tri-(ethoxy-ethoxy)-silane, phenyl triethoxysilane and cresyl triethoxysilanes. The preparation of these silanes takes place according to generally known methods. The silanes are used preferably either as alkaline water solutions or dissolved in an alcohol having 2-4 carbon atoms. Also alcoholic water solutions may be used.

As siloxanes there may be used low molecular compounds, of which the number of siloxane units

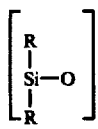

is below 10, as well as compounds having a higher molecular weight with n greater than 10. As low molecular compounds there are used preferably compounds resulting from partial hydrolysis of said alkoxysilanes. However, it is also possible to use for instance hexamethyl disiloxane, hexaphenyl-disiloxane, dimethyltetraphenyl-disiloxane, tetramethyl diphenyl disiloxane or a corresponding methyl-ethyl, methyl-butyl and ethyl-phenyl-siloxanes.

As siloxanes with higher molecular weight there may also be used the compounds obtained by partial hydrolysis and subsequent condensation of the above alkoxy silanes or also of chloro silanes. However, also polysiloxanes may be used which have been prepared by other known methods.

The siloxanes are used dissolved in an organic solvent.

The amount of organic solicon compound applied to the pretreated surface in the part impregnation depends essentially on the special structure of the impregnated ballast material and the desired hydrofobia. Already by using a 10% by weight silane or siloxane solution good results are obtained. The solutions of the organic silicon compounds may, however, also be more concentrated or more dilute. Suitably 5–40% solutions are used. In repeated application of impregnation solution also solutions having less than 5% by weight of organic silicon compound may be used.

The chemical treatment of the ballast material may be preceded by cleaning according to known methods.

The impregnated ballast material or the water-repellant ballast material and the remaining ballast material may have different forms, colour and other characteristics. By colourizing the impregnated ballast material in another colour than the mortar, the concrete or the colour in other respects it is easy optically to decide whether the mixing has been effective and even and whether the impregnating material has been evenly distributed over the surface. This effect may be used as a signal effect to find out whether impregnation has been applied and by what quality the work has been done and how high is the average concentration of the impregnation. Of course, it is possible also to colourize the non-impregnated part of the material and possibly necessary binder to observe the above-mentioned signal effect.

It is also possible to crush or in another manner mechanically treat the impregnated or water-repellant ballast material before the admixing with the binder. It is also possible to agglomerate impregnated or water-repellant ballast material to smaller or bigger building elements.

The invention will now be further illustrated below by examples, where the outer extremes in the prior art, namely on the one hand the use of unimpregnated building material and on the other hand the use of wholly impregnated building material, is compared with the part impregnating technique of this invention.

EXAMPLE

A mortar for thin layers, e.g. about 1–2 mm, consisting of a ballast of crushed or finely divided stone, half of which has a maximum grain size of 0.25 and the other half having a maximum grain size of 0.50 mm, and a binder of lime and cement was prepared. In this connection different charges were prepared with the ballast unimpregnated, part-impregnated or completely impregnated. The ballast was impregnated by treating the ballast material with 40% solution of silane in methyl alcohol. After the impregnation the ballast material was dried. The weight proportions in the mortar was 30 g binder per 100 g ballast, the necessary amount of water being added in conformity with conventional art.

The thin layer samples were prepared by applying the different charges of mortar on light weight concrete pieces and were tested with regard to water throughlet and wet diffusion. In order to determine the water throughlet the samples were subjected to a water pressure of 100 mm water column for 24 hours. The amount of water penetrated into the samples was determined after 30 minutes, 90 minutes and 24 hours.

The value of the wet diffusion can be said to define the ability of the material to release contained or penetrated water, whether present in the layer or its support. To determine the wet diffusion a vessel was used containing a swamp soaked with water or material consisting of prepared thin mortar samples arranged thereabove. Inside the material of the vessel water saturation at normal atmospheric pressure is assumed. Outside the vessel certain conditions with regard to atmospheric moisture, temperature and air circulation were maintained corresponding to practically prevailing climate conditions.

Four thin layer samples were prepared as follows.

Sample 1 consists of a thin layer sample of mortar having the above composition and being after its preparation impregnated with 40% solution of silane in methyl alcohol. The mortar was supplied with 0.2 l/m².

Sample 2 is prepared starting from a ballast part-impregnated to 50%.

Sample 3 also refers to a part-impregnated mortar but in this case 20% of the ballast is impregnated.

Sample 4 consists of an unimpregnated sample of a mortar having the above composition.

In the table below the testing results are summarized. The water throughlet is given in litre/m² and hour, whereas the wet diffusion is stated in g/m², hour and mm Hg. With regard to the values of the water throughlet these are based on measuring the water penetration during the periods 0–30 minutes, 30–90 minutes and 90 minutes to 24 h.

Table.

| Water throughlet l/m² h | | Wet diffusion g/m² h mm Hg | Note |
|---|---|---|---|
| 0.15 | 0–30 min. | | |
| 0.05 | 30–90 min. | | |
| 0.01 | 90 min.—24 hours | 0.91 | complete impregnation |
| 0.28 | | | |
| 0.03 | " | 13.2 | part impregnation |
| 0.02 | | | |
| 0.45 | | | |
| 0.38 | " | 20.0 | part impregnation |
| 0.15 | | | |
| 3.10 leaking leaking | " | 30.2 | without impregnation |

As is clear from the above test results neither complete impregnation nor no impregnation at all give useful results, since in the first case the wet diffusion is too low to enable drying of the material after water penetration, whereas in the latter case the water throughlet is too great to enable the material to resist the exterior water pressure due to rain. However, part impregnation in conformity with this invention results in the desirable balancing of the water throughlet and wet diffusion characteristics, so that the disadvantages accompanying the prior art are effectively avoided.

The invention must in no way be regarded to be delimited to the above given specific embodiments and is in fact applicable to all building materials composed of ballast material and binder.

What is claimed is:

1. A process for the preparation of plaster or mortar as a hydrofobous building material, wherein said plaster or mortar contains a ballast material and a binder, comprising impregnating the ballast material in a proportion of 5 to 90% by volume of said ballast material with a water repellant, said water repellant being a silane or a siloxane solution, a predominant part of the water repellant ballast material having a grain size of about 0.1 to 4 mms; drying said impregnated ballast material, admixing said impregnated ballast with said binder in an amount sufficient for forming plaster or mortar, said plaster or mortar possessing substantial water-repellant and substantial water vapor diffusion characteristics by allowing the material to reject water yet allowing the expelling of moisture from or through the incorporated plaster or mortar.

2. The process as defined in claim 1 wherein the impregnant is a silane and is used as a solution consisting of 40% silane in methanol.

3. The process of claim 1 wherein one half of the ballast material has a maximum particle size of 0.25 mm and the other half has a maximum particle size of 0.50 mm.

4. The process of claim 1 wherein at least 10% by volume of the ballast material is water repellant.

5. The process of claim 1 wherein up to 50% of the ballast material is water repellant.

6. The process of claim 1 wherein 20% to 50% by volume of the ballast material is water repellant.

7. The process of claim 1 wherein the binder is mixed with the ballast material at a ratio of 20 parts to 100 parts.

8. The process of claim 1 wherein the binder is mixed with the ballast material at a ratio of 30 parts to 100 parts.

9. A hydrofobous building material consisting essentially of a mixture of a binder of lime mortar, cement mortar, or plaster in an amount sufficient to bind a ballast material therefor, wherein said ballast material is crushed cement mortar, crushed lime mortar, crushed concrete, crushed clay brick, or crushed stone having a particle size of about 0.1 to 4 mms, wherein 5% to about 90% by volume of the ballast material is made water-repellant by impregnating with a 5% to 40% solution of a silane or a siloxane and then dried and a sufficient amount of water-repellant ballast material is mixed with the binder to impart to the cured building material a water penetration ability not exceeding 0.5 liter/m², h and a water vapor diffusion of at least 1 g/m², h, mm Hg.

10. The composition of claim 9 wherein the ballast material contains silane impregnated with a 5% to 40% solution of silane.

11. The composition of claim 9 wherein the ballast material contains silane impregnated with a 5% to 40% solution of siloxane.

12. The composition of claim 9 wherein the 20% to 50% by volume of the ballast material is impregnated with silane or siloxane.

* * * * *